(12) United States Patent  
Robinson et al.

(10) Patent No.: US 7,948,550 B2
(45) Date of Patent: May 24, 2011

(54) ELECTRO-OPTIC IMAGING SYSTEM WITH ABERRATED TRIPLET LENS COMPENSATED BY DIGITAL IMAGE PROCESSING

(75) Inventors: M. Dirk Robinson, Menlo Park, CA (US); David G. Stork, Portola Valley, CA (US)

(73) Assignee: Ricoh Co., Ltd., Tokyo (JP)

( * ) Notice: Subject to any disclaimer, the term of this patent is extended or adjusted under 35 U.S.C. 154(b) by 529 days.

(21) Appl. No.: 12/215,742

(22) Filed: Jun. 27, 2008

(65) Prior Publication Data
US 2009/0322928 A1 Dec. 31, 2009

(51) Int. Cl.
*H04N 5/225* (2006.01)
*G02B 13/16* (2006.01)
*G02B 27/46* (2006.01)

(52) U.S. Cl. ........................................ 348/335; 359/559

(58) Field of Classification Search .................. 348/335, 348/340, 342; 359/558, 559, 708, 709, 710
See application file for complete search history.

(56) References Cited

U.S. PATENT DOCUMENTS

| | | | |
|---|---|---|---|
| 4,214,814 A | 7/1980 | Ogino et al. | |
| 4,273,424 A | 6/1981 | Nanjoh | |
| 4,310,221 A | 1/1982 | Momiyama et al. | |
| 4,948,236 A | 8/1990 | Hirano | |
| 5,227,890 A | 7/1993 | Dowski, Jr. | |
| 5,267,086 A | 11/1993 | Hirano | |
| 5,521,695 A | 5/1996 | Cathey, Jr. et al. | |
| 5,617,255 A | 4/1997 | Yamada | |
| 5,748,371 A | 5/1998 | Cathey, Jr. et al. | |
| 5,796,530 A | 8/1998 | Oshita | |
| 5,870,179 A | 2/1999 | Cathey, Jr. et al. | |
| 6,021,005 A | 2/2000 | Cathey, Jr. et al. | |
| 6,069,738 A | 5/2000 | Cathey, Jr. et al. | |
| 6,414,802 B1 | 7/2002 | Betensky | |
| 6,525,302 B2 | 2/2003 | Dowski, Jr. et al. | |
| 6,600,468 B1 * | 7/2003 | Kim et al. .................. 345/87 |
| 6,842,297 B2 | 1/2005 | Dowski, Jr. | |
| 6,873,733 B2 | 3/2005 | Dowski, Jr. | |
| 6,911,638 B2 | 6/2005 | Dowski, Jr. et al. | |
| 6,940,649 B2 | 9/2005 | Dowski, Jr. | |
| 7,215,493 B2 | 5/2007 | Olmstead et al. | |
| 7,436,449 B2 * | 10/2008 | Mihara .................. 348/362 |
| 7,616,841 B2 * | 11/2009 | Robinson et al. ......... 382/312 |
| 7,692,709 B2 * | 4/2010 | Robinson et al. ......... 348/335 |
| 2001/0016083 A1 * | 8/2001 | Hayashi et al. .......... 382/312 |
| 2002/0118457 A1 | 8/2002 | Dowski, Jr. | |
| 2002/0149674 A1 * | 10/2002 | Mathews et al. ......... 348/144 |
| 2002/0195548 A1 | 12/2002 | Dowski, Jr. et al. | |

(Continued)

OTHER PUBLICATIONS

Maeda, P. Y. et al., "Integrating Lens Design with Digital Camera Simulation," 5678 SPIE Proceedings SPIE Electronic Imaging, Feb. 2005, pp. 48-58, San Jose, CA.

(Continued)

*Primary Examiner* — Kelly L Jerabek
(74) *Attorney, Agent, or Firm* — Fenwick & West LLP

(57) ABSTRACT

An electro-optic imaging system includes an aberrated triplet lens, a detector subsystem and a digital image processing subsystem. The triplet lens is not fully corrected for all aberrations (typically suffering from significant spherical aberration), with the digital image processing subsystem compensating for deficiencies in the triplet lens. In this way, an increased depth of field can be realized.

30 Claims, 11 Drawing Sheets
(3 of 11 Drawing Sheet(s) Filed in Color)

U.S. PATENT DOCUMENTS

| | | |
|---|---|---|
| 2003/0057353 A1 | 3/2003 | Dowski, Jr. et al. |
| 2003/0169944 A1 | 9/2003 | Dowski, Jr. et al. |
| 2003/0173502 A1 | 9/2003 | Dowski, Jr. et al. |
| 2004/0021783 A1* | 2/2004 | Mihara .................... 348/240.99 |
| 2004/0145808 A1 | 7/2004 | Cathey, Jr. et al. |
| 2004/0190762 A1 | 9/2004 | Dowski, Jr. et al. |
| 2004/0228005 A1 | 11/2004 | Dowski, Jr. |
| 2004/0257543 A1 | 12/2004 | Dowski, Jr. et al. |
| 2005/0088745 A1 | 4/2005 | Cathey, Jr. et al. |
| 2005/0197809 A1 | 9/2005 | Dowski, Jr. et al. |
| 2005/0264886 A1 | 12/2005 | Dowski, Jr. |
| 2006/0285002 A1 | 12/2006 | Robinson et al. |
| 2007/0268374 A1* | 11/2007 | Robinson .................... 348/222.1 |
| 2008/0074507 A1* | 3/2008 | Ohara et al. ................ 348/222.1 |
| 2008/0080019 A1* | 4/2008 | Hayashi et al. ................ 358/474 |
| 2009/0067040 A1* | 3/2009 | Izumi ............................ 359/356 |

OTHER PUBLICATIONS

Cathey, W. T. et al., "New Paradigm for Imaging Systems," Applied Optics, Oct. 10, 2002, pp. 6080-6092, vol. 41.

* cited by examiner

ELECTRO-OPTIC IMAGING SYSTEM WITH ABERRATED TRIPLET LENS COMPENSATED BY DIGITAL IMAGE PROCESSING

BACKGROUND OF THE INVENTION

1. Field of the Invention

This invention relates generally to electro-optic imaging systems having aberrated optics (for example aberrated lens triplets) compensated by digital image processing.

2. Description of the Related Art

The versatility and performance of the traditional triplet lens system explains its prevalence in fixed-focus photographic imaging systems. The standard triplet design comprises two positively powered lens elements separated by a single negatively powered lens element (PNP). The conventional triplet has the advantage of having enough degrees of freedom to minimize all of the third-order optical aberrations.

While the standard triplet form performs acceptably for a wide range of applications, the basic design form suffers from the traditional limitation of low depth of field for fast (low F/#) systems. This limitation is a result of the triplet design form's relative success at minimizing optical aberrations. A conventional, well corrected, low F/# system inherently has a low depth of field. The depth of field can be increased by increasing the F/#. However, in many fixed-focus imaging applications, such as security or mobile imaging, decreasing the aperture size, and hence the amount of light in the system, to increase the depth of field is not acceptable.

Thus, there is a need for electro-optic imaging systems (including those based on triplet lenses) that have good imaging performance but also increased depth of field.

SUMMARY OF THE INVENTION

The present invention overcomes the limitations of the prior art by providing a triplet lens, a detector subsystem and a digital image processing subsystem. The triplet lens is not fully corrected for all aberrations (typically suffering from significant spherical aberration and/or coma), with the digital image processing subsystem compensating for deficiencies in the triplet lens. In this way, an increased depth of field can be realized.

In one aspect, the optical MTF of the aberrated triplet lens initially falls faster than a well-corrected triplet, but remains above zero to higher frequencies, avoiding any zero-crossings. This preserves more of the high frequency content. In addition, the optical MTF retains a similar shape over a wider range of defocus. The resulting blurry image captured by the detector subsystem is sharpened by the digital image processing subsystem. In this way, the range of the depth of field can be increased relative to a conventional system using a well-corrected triplet.

Specific classes of triplet designs include the following. In one class of designs, the triplet lens is rotationally symmetric. That is, each of the three lens elements is rotationally symmetric. Furthermore, they may also be spherical. One particular class of triplets takes the NPN form: negative first element, positive second element, negative third element. Note that this is the inverse of the conventional triplet which is PNP. Hence, it will be referred to as an inverted triplet. Another class takes the NPP form: negative first element, positive second element, positive third element.

In one class of optical designs, the optical MTF of the triplet remains above 0 (i.e., no zero-crossings) and below 0.75 for all frequencies between 0.3 and 1 times the Nyquist frequency of the detector subsystem, or more preferably for all frequencies between 0.2 to 1× Nyquist frequency. In alternate designs, the optical MTF remains between 0.1 to 0.5 for all frequencies between 0.5 to 1× Nyquist frequency, or more preferably for all frequencies between 0.3 to 1× Nyquist frequency. Alternately, the optical MTF remains between 0.1 to 0.6 for all frequencies between 0.3 to 1× Nyquist frequency. Furthermore, the optical MTF preferably stays within these bounds for all image plane positions within the desired range of defocus. The desired range of defocus depends on the application, but could be from one to several waves of defocus, or more.

The digital image processing subsystem provides normalized gain to enhance lower contrast frequencies. Throughout, the term normalized gain will be used to mean the gain at a frequency relative to the DC gain. In one alternative, the digital image processing subsystem provides a normalized gain of at least 1.0 to at least some of the frequencies between 0.20 and 0.80× the Nyquist frequency. Alternately, the digital image processing subsystem provides a normalized gain of at least 1.5 somewhere in the range 0.3 to 1× the Nyquist frequency, preferably a normalized gain of at least 2.0 in that frequency range, and more preferably a normalized gain of at least 2.5 or even 3.0 to frequencies in that frequency range. The above characterizations preferably are true over the desired range of defocus. In one approach, this is true since the same image processing applied (e.g., filter kernel) is applied to all defocus positions.

The resulting system MTF (i.e., the aggregate transfer function of the optics, detector subsystem and digital image processing subsystem) can have values between 0.8 and 1.1 for all frequencies in the range of 0.2 to 0.4× Nyquist frequency and over the entire desired range of defocus. An alternate system MTF remains between 0.6 and 1.1 for all frequencies in the range 0.4 to 0.6× Nyquist frequency, or between 0.5 and 1.1 in the range 0.5 to 0.7× Nyquist frequency. Yet another implementation has a system MTF that is above 0.4 for all frequencies in the range 0.5 to 0.8× Nyquist frequency.

For these systems, the Nyquist rate is below the diffraction-limited spatial frequency at the center wavelength of interest. The ratio of the diffraction-limited spatial frequency to the Nyquist frequency is the oversampling factor O. In one aspect, the oversampling factor O for the inverted triplet system is greater than 2.5, and alternately greater than 4.0 or even 5.0. For example, if the optical system is F/4.0 with a center frequency of 500 nm, the diffraction-limited spatial frequency is 500 lp/mm. A pixel pitch of 5 microns has a Nyquist frequency of 100 lp/mm. The oversampling factor for this system is 5.

In other aspects, the electro-optic imaging system can have the characteristic that the back focal distance is substantially longer than the back focal distance which would minimize the spot size. Conversely, this means that the RMS spot size at the actual back focal distance is significantly larger than the RMS spot size at the back focal distance which would minimize the spot size. Similarly, the RMS wavefront error typically is also significantly larger than that at the back focal distance which minimizes the wavefront error. The RMS spot size and RMS wavefront error can be 20%, 50%, or even 100% larger that the minimum values.

In other aspects, the triplet lens is designed to have uncorrected spherical aberration (and possibly also coma aberration). This can be used so that the presence of other aberrations, such as defocus or astigmatism, does not introduce zeros into the optical MTF. Zero-crossings preferably are avoided as they represent lost information that cannot be recovered through image processing. The amount of uncorrected spherical aberration required is a function of the oversampling factor O and the desired range in the depth of focus.

Various types of digital image processing can be used. Linear and/or nonlinear, spatially varying and/or spatially invariant, bandpass, highpass, rotationally symmetric, and rotationally nonsymmetric are some examples.

These approaches can be used to achieve greater depth of field at the same or better field of view, F/# and spectral bandwidth compared to conventional triplet systems. Example designs can achieve a depth of field range of 2 waves at a full field of view of at least 30 degrees, F/5 or faster, for conventional color (RGB) imaging sensors.

Other aspects of the invention include applications and components for the systems described above, and methods corresponding to all of the foregoing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention has other advantages and features which will be more readily apparent from the following detailed description of the invention and the appended claims, when taken in conjunction with the accompanying drawings, in which:

FIG. 2b is a diagram of an aberrated triplet designed for the same application as the conventional triplet of FIG. 2a.

FIG. 3a (prior art) is a graph of optical MTFs for the conventional triplet of FIG. 2a.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
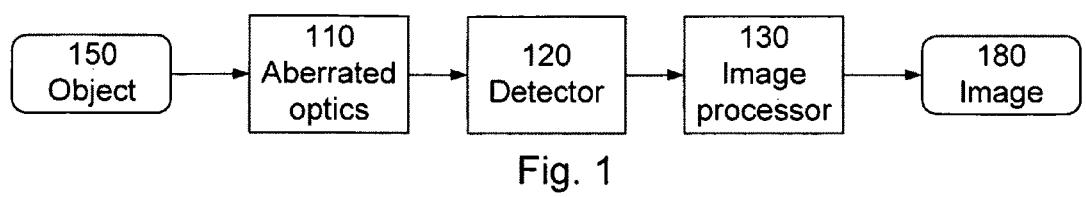
FIG. 1 is a block diagram of an electro-optic imaging system according to the invention.

FIG. 1 is a block diagram of an electro-optic imaging system according to one aspect of the invention. The imaging system includes aberrated optical subsystem 110 (e.g., a lens assembly), detector subsystem 120 (e.g., CCD detector array) and digital image processing subsystem 130 (e.g., typically implemented in dedicated chips or software). The imaging system produces a digital image 180 of an object 150. Using a triplet lens as an example optical subsystem 110, the triplet lens is not diffraction-limited. Rather, it suffers from aberrations which are compensated, at least in part, by the digital image processing subsystem 130. However, the aberrated triplet lens 110 is also less sensitive to defocus. Thus, the depth of field is increased compared to a traditional diffraction-limited triplet.

Figure 2A:
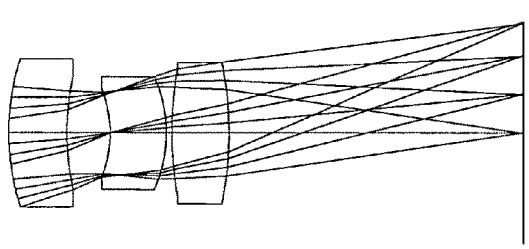
FIG. 2a (prior art) is a diagram of a conventional triplet.
Figure 2B:
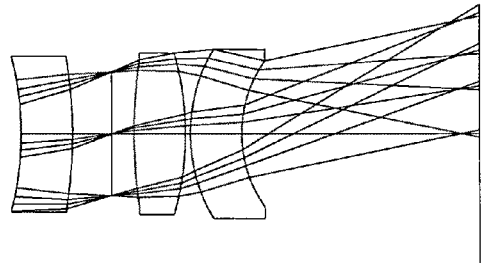

As an example, compare a traditional triplet-based system with the system in FIG. 1. Assume a 50° full field of view, focal length f~5.6 mm, and F/3.0 optical system. Also assume the detector subsystem has a detector array with 5.6 µm pixels (i.e., 5.6 µm pitch). This corresponds to a Nyquist frequency of 90 lp/mm. Assume a nominal object distance of 5 m. FIG. 2a (prior art) shows a conventional triplet designed for these specifications. FIG. 2b shows an aberrated triplet designed for the same specifications. This triplet is a variant of the triplet shown in FIG. 7 and Table 2. Note that the conventional triplet of FIG. 2a takes a standard PNP form (positive-negative-positive lens elements), but this example aberrated triplet takes the exact opposite form: NPN (negative-positive-negative lens elements).

FIGS. 3-6 compare the performance of these two systems, with the (a) figure showing the performance of the traditional triplet and the (b) figure showing the corresponding performance of the aberrated triplet.

FIG. 3 shows the optical MTFs up to the Nyquist frequency. Curves 311a and 310b are the optical MTFs for objects located at infinity. Curves 320a and 320b are the optical MTFs for objects located at 0.5 m. For the conventional triplet, optical MTF 310a (object at infinity) shows good contrast out to the Nyquist frequency. However, optical MTF 320a (object at 0.5 m) suffers from a zero crossing. Information at that frequency will be lost and cannot be recovered by the digital image processing subsystem.

In contrast, the optical MTFs 310b and 320b for the aberrated triplet may have lower contrast at lower frequencies (e.g., around 10 lp/mm compared to optical MTFs 310a and 320a), but they preserve the contrast at all frequencies up to the Nyquist frequency by avoiding zero-crossings. The digital image processing subsystem enhances the contrast. Furthermore, the optical MTF curves for the aberrated triplet do not vary significantly as a function of object distance (i.e., as a function of defocus), whereas the optical MTFs 310a and 320a for the conventional triplet are significantly different. As a result, not only can the digital image processing subsystem recover information at all frequencies for the aberrated system, but the digital image processing subsystem is also simplified since a single filter could be used to restore contrast for objects at either distance. Conversely, the aberrated system will perform better if the object distance is not known. The system shown in FIG. 2b is also robust due to its relative insensitivity to the typical defocus and astigmatism introduced by manufacturing errors.

Figure 3A:
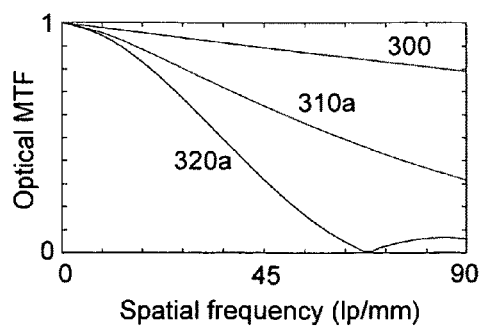
Figure 3B:
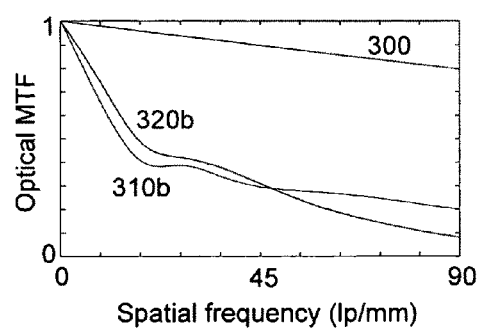
FIG. 3b is a graph of optical MTFs for the aberrated triplet of FIG. 2b.

To visually compare the performance of these two systems, imaging of two different objects was simulated by applying the optical MTFs shown in FIGS. 3a and 3b to the objects. The results are shown in FIGS. 4-6, with the (a) figures produced by the conventional optical MTFs of FIG. 3a and the (b) figures produced by the aberrated optical MTFs of FIG. 3b. The images shown are of three-dimensional scenes. However, note that the simulation approach above treats the object as a flat planar object. That is, the object is a picture of the three-dimensional scene and not the actual scene with three-dimensional depth. This was done for convenience of simulation. The following images provide a qualitative comparison of the two triplet lens systems.

Figure 4C:
FIGS. 4a (prior art) and 4b-4c are simulated images based on the optical MTFs in FIGS. 3a and 3b, respectively.
Figure 4B:
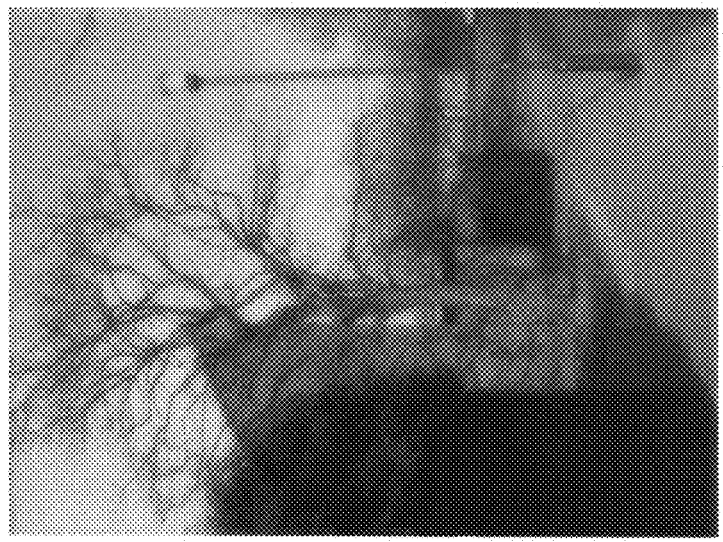
Figure 4A:

FIG. 4 simulates an object located at infinity. FIG. 4a shows the image produced by the traditional triplet system. The image shows good contrast, basically requiring no subsequent processing. The image after additional image processing will look not much different from what is shown in FIG. 4a.

FIGS. 4b and 4c are images for the aberrated triplet system. FIG. 4b shows the image captured by the detector subsystem. The image appears blurry. FIG. 4c shows the resulting image after digital sharpening. The contrast is restored with low noise amplification. The image is comparable to that produced by the traditional system. In this simulation, a standard Wiener filter is applied to sharpen the image and the filter is unconstrained in terms of size or bit depth.

Figure 5B:
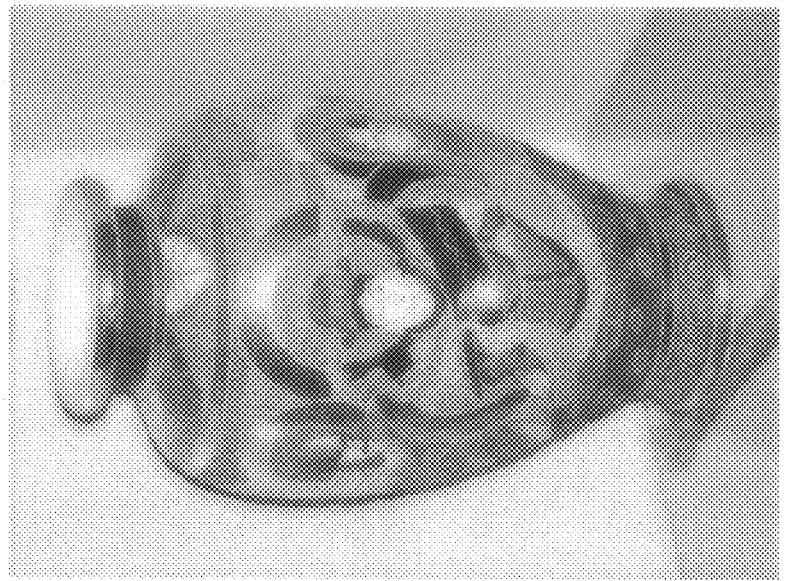
FIGS. 5a (prior art) and 5b are simulated images based on the optical MTFs in FIGS. 3a and 3b, respectively.
Figure 5A:
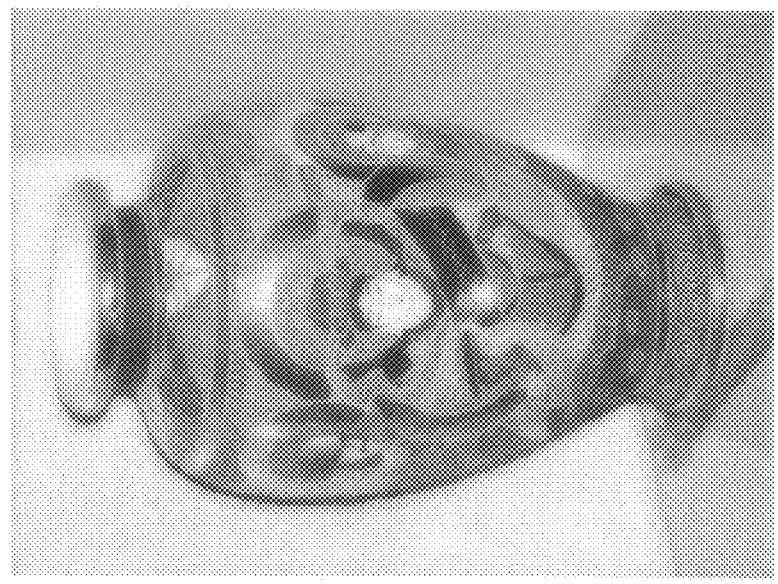

FIGS. 5 and 6 show simulated images for an object located at 0.5 m. FIG. 5 shows the image captured by the detector subsystem, for both the traditional system and for the aberrated system. Both images appear blurry. The traditional image (FIG. 5a) is blurry primarily due to defocus, whereas the image for the aberrated triplet (FIG. 5b) is blurry primarily due to spherical and coma aberrations. While both images appear blurry, the nature of the blur (and whether it can be compensated by image processing later) is very different for the two images.

If, by some means, the exact object distance were known, we could attempt to sharpen the defocused image produced by the traditional triplet. However, because of the zero-crossing in the optical MTF (see curve 320A in FIG. 3), the image cannot be completely restored through image processing. For the sharpening filter, there is a tradeoff between using strong filters which create objectionable ringing artifacts or using weak filters and suffer from a blurry image. The images in FIG. 6a show an attempt to balance these two artifacts. While the image is slightly sharper than the original defocused image, some amount of ringing artifacts is apparent.

Figure 6B:
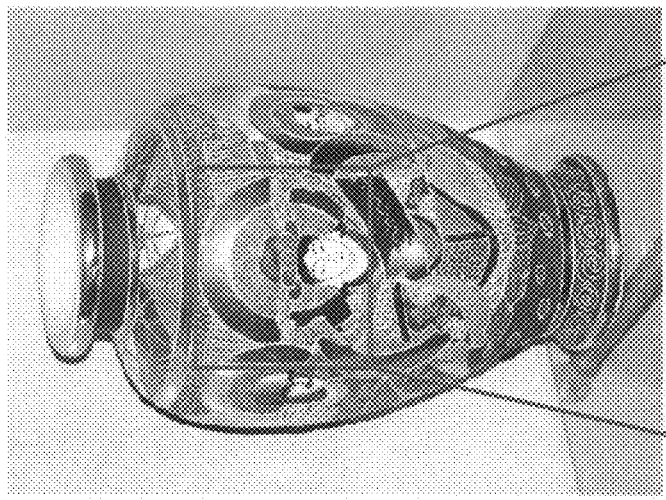
FIGS. 6a (prior art) and 6b are the images in FIGS. 5a and 5b, after digital image processing.
Figure 6B:
Figure 6A:
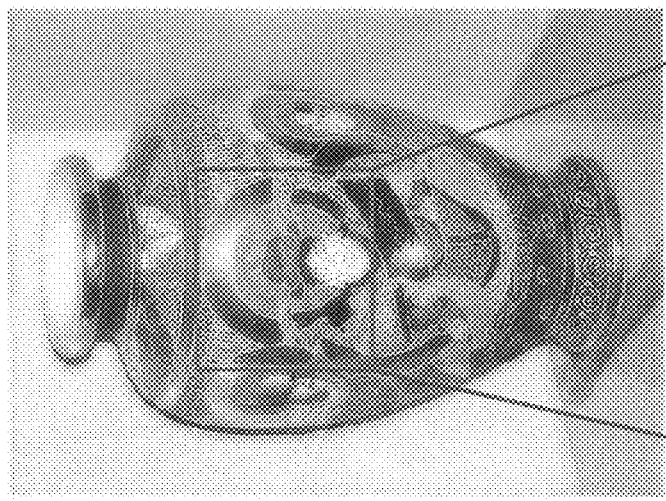
Figure 6A:
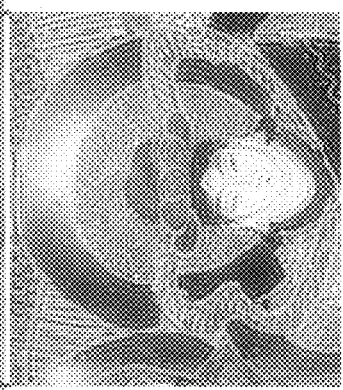

FIGS. 5b and 6b show corresponding images for the aberrated triplet. Note that in this example, the same sharpening filter that was used for the object at infinity (FIG. 4b) is also used to sharpen this case. That is, the image in FIG. 6b shows the image after applying the same filter used for FIG. 4b. The filtered image shows good contrast with very little filtering artifacts (e.g., no ringing). If additional incremental improvement is desired, a separate filter could be designed specifically for this object distance. FIGS. 4-6 demonstrate the increased depth of field of the aberrated system, and also demonstrate that the image processing is less sensitive to the unknown depth of the object.

In this example, the residual spherical and coma aberrations are used so that the presence of other aberrations, such as defocus or astigmatism, does not introduce zeros into the optical MTF. Zero-crossings preferably are avoided as they represent lost information that cannot be recovered through image processing. For example, Table 1 below shows the amount of uncorrected spherical aberration that is sufficient for a system with the given oversampling factor and a desired range in the depth of field.

TABLE 1

Uncorrected spherical aberration used to increase depth of field

| Desired range in depth of field (waves) | Oversampling factor | Uncorrected spherical aberration (waves) |
|---|---|---|
| 1 | 2.5 | 1 |
| 1.3 | 3 | 2 |
| 1.5 | 4 | 3 |
| 1.8 | 5 | 4 |
| 2 | 5.6 | 5 |
| 2.2 | 6 | 6 |
| 2.5 | 6.5 | 7 |
| 2.8 | 7.5 | 8 |

Other tradeoffs can be made between DOF range and the oversampling factor.

For example, one method for satisfying these relationships is by controlling the effective F# of the optical system. For example, in the case of the design shown in FIG. 7, by changing the effective entrance pupil diameter, the designer can control the effective amount of spherical abberation as well as the oversampling factor for a given pixel pitch. In the case of the design shown in FIG. 7, if we shrink the entrance pupil using an aperture so that the entrance pupil diameter (EPD) is 1.2 mm, then the system will have approximately 1 wave of spherical aberration and will satisfy the relationship for sensors having pixels in the range of 3 to 4 microns. If the EPD is 1.3, the SA is about 2 waves and will work for pixels in the range 3.5 to 4.5 microns. If the EPD is 1.45, the SA is about 3 waves which will work for pixels in the range 4 to 5 microns. If the EPD is 1.5, the SA is about 4 waves which will work for pixels in the range 4.5 to 5.5 microns. If the EPD is 1.62, the SA is about 5 waves which will work for pixels in the range 5 to 6 microns. If the EPD is 1.7, the SA is about 6 waves which will work for pixels in the range 5.5 to 6.5 microns. If the EPD is 1.78, the SA is about 7 waves which will work for pixels in the range 5.5 to 7 microns.

FIGS. 7-17 show additional examples of aberrated triplet designs. See also U.S. patent application Ser. No. 11/155,870, "End to End Design of Electro-optic Imaging Systems," which is incorporated herein by reference and describes various techniques for designing optical subsystems compensated by image processing.

Figure 7:
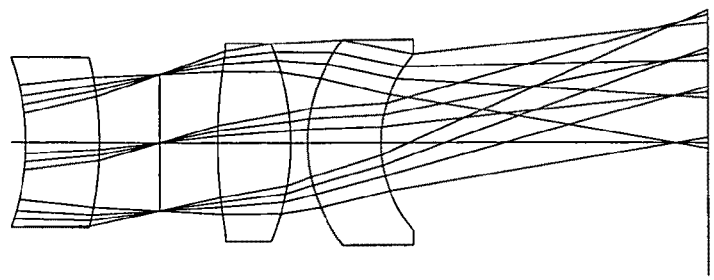
FIG. 7 is a diagram of another aberrated triplet according to the invention.

FIGS. 7-10 are for an NPN triplet similar to the one shown in FIG. 1b. FIG. 7 shows the triplet. This triplet was designed for an application with a 40 degree full field of view, F/2.9, visible color (RGB) imaging, 4 μm pixels (pitch), and ⅕ inch detector array. Table 2 lists the optical prescription. Surface 0 has a variable thickness, indicating the varying object distance which ranges from 300 mm to infinity in this example.

TABLE 2

Optical prescription for NPN triplet of FIG. 7

| Surface | Type | Curvature | Thickness | Glass | Semi-Diameter |
|---|---|---|---|---|---|
| 0 | STANDARD | 0.00E+00 | Variable | | 1.09E+04 |
| 1 | STANDARD | −2.74E−01 | 1.00E+00 | SF57 | 1.19E+00 |
| 2 | STANDARD | −1.82E−01 | 8.29E−01 | | 1.17E+00 |
| 3 | STANDARD | 0.00E+00 | 8.01E−01 | | 9.55E−01 |
| 4 | STANDARD | 1.28E−01 | 1.00E+00 | N-PK52 | 1.28E+00 |
| 5 | STANDARD | −2.71E−01 | 2.35E−01 | | 1.38E+00 |

TABLE 2-continued

Optical prescription for NPN triplet of FIG. 7

| Surface | Type | Curvature | Thickness | Glass | Semi-Diameter |
|---|---|---|---|---|---|
| 6 | STANDARD | 4.12E−01 | 1.00E+00 | N-PK51 | 1.44E+00 |
| 7 | STANDARD | 5.23E−01 | 4.49E+00 | | 1.24E+00 |
| 8 | STANDARD | 0.00E+00 | 0.00E+00 | | 1.86E+00 |

FIGS. 8a-8c and 9a-9c show optical MTFs for this triplet. The Nyquist frequency is 125 lp/mm. FIG. 8 shows the optical MTF measured at λ=0.6563 μm and FIG. 9 shows the optical MTFs at λ=0.4861 μm. In each of these, figures (a), (b) and (c) correspond to objects at 30 m, 0.8 m and 0.3 m, respectively. The nominal object distance is 0.8 m. This range of object distances corresponds to a range in defocus of 1.8 waves. The diffraction-limited optical MTF is also shown in FIGS. 8 and 9 for comparison. The oversampling factor for the green channel is 5.

Figure 10:
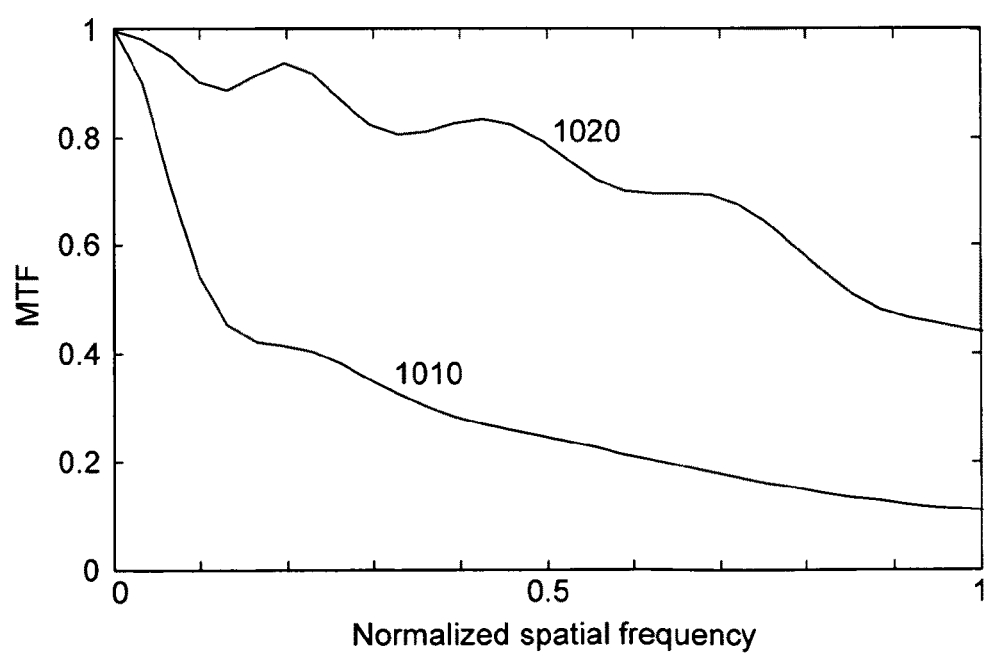
FIG. 10 is a graph of the MTF for the aberrated triplet of FIG. 7, before and after image processing.
Figure 8A:
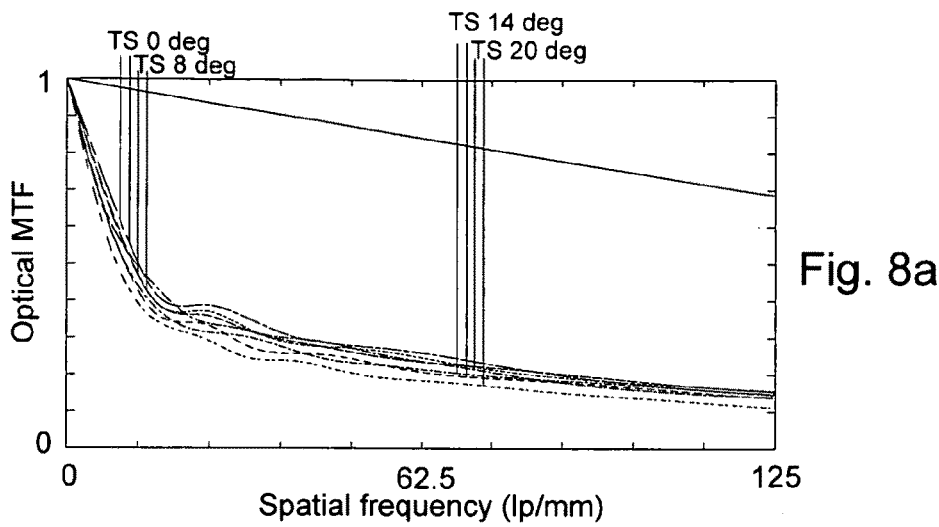
FIGS. 8a-8c and 9a-9c are graphs of optical MTFs for the aberrated triplet of FIG. 7.
Figure 8B:
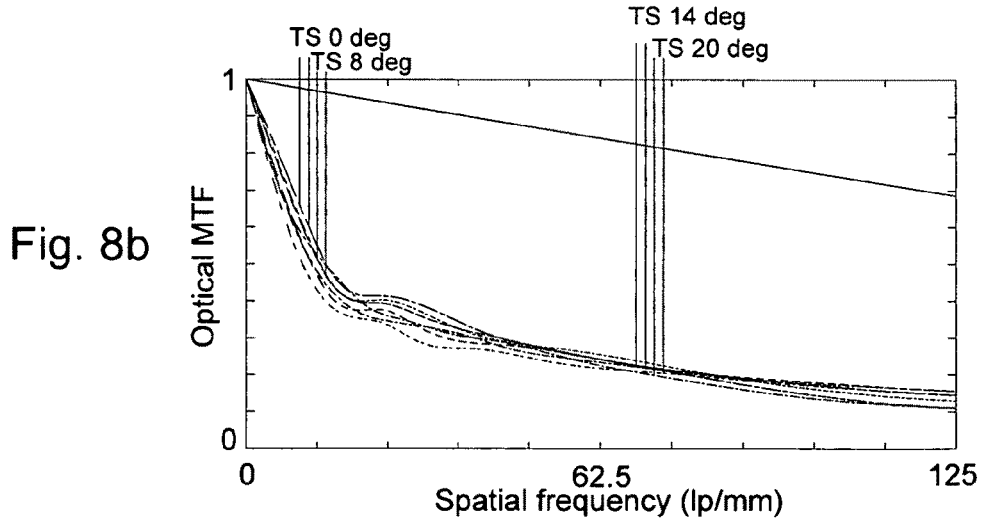
Figure 8C:
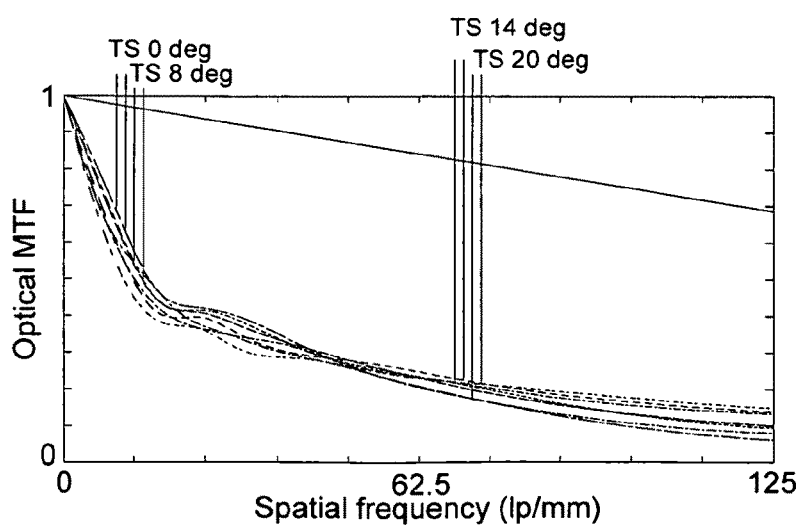
Figure 9A:
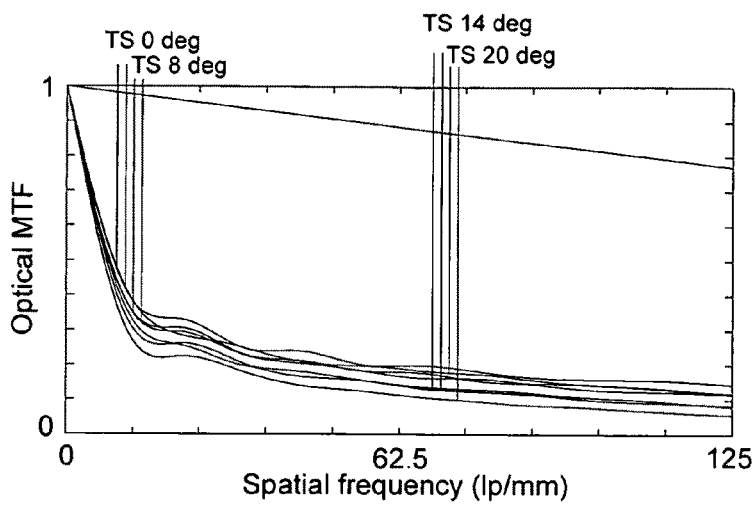
Figure 9B:
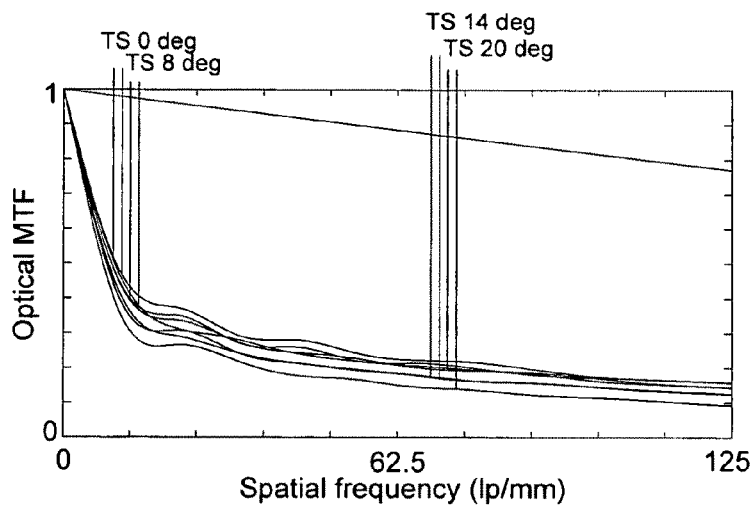
Figure 9C:
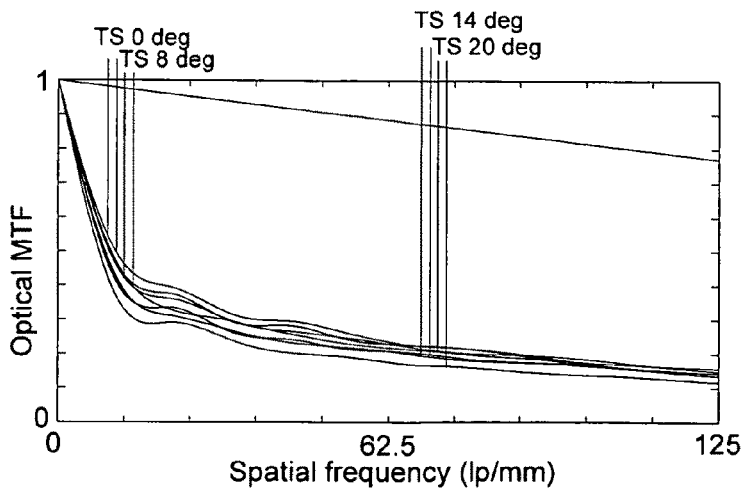

FIG. 10 shows the optical MTF 1010 before image processing and the system MTF 1020 after image processing. In this example, a linear, spatially-invariant 11×11 filter is used. The MTF shows the average MTF over the field of view for the green wavelength. The MTFs are normalized to the Nyquist frequency.

The triplet in FIG. 7 also has the characteristic that the back focal distance is substantially longer than the back focal distance which would minimize the spot size (or the wavefront error). In FIG. 7, the back focal distance is 4.49 mm. At the green wavelength of 540 nm, this results in an RMS spot size of approximately 44 microns in radius and an RMS wavefront error of approximately 1.1 waves of error. If the detector subsystem were moved to a back focal distance of 4.2 mm, this would minimize the RMS spot size at approximately 18 microns in radius. A back focal distance of 4.29 mm would minimize the RMS wavefront error at approximately 0.5 waves of error. Note that the RMS spot size and wavefront error at the actual back focal distance are more than twice the minimum values.

Figure 11:
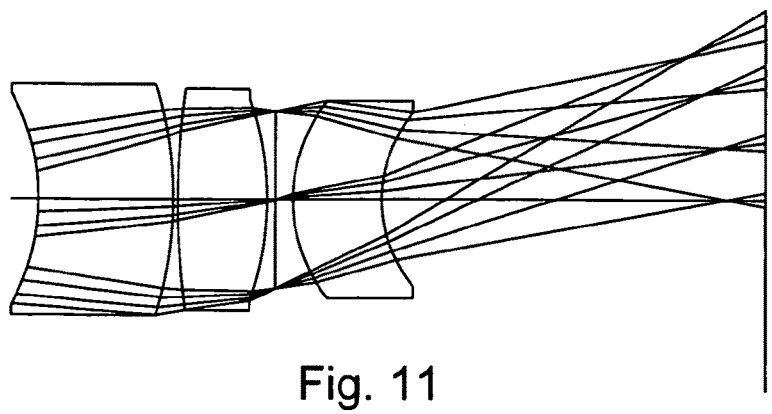
FIG. 11 is a diagram of yet another aberrated triplet according to the invention.

FIGS. 11-14 show a more extreme version of the NPN triplet. FIG. 11 shows the triplet, with the optical prescription given in Table 3. This triplet was designed for an application with a 50 degree full field of view, F/2.6, visible color (RGB) imaging, 5 μm pixels (pitch), and ¼ inch detector array.

TABLE 3

Optical prescription for NPN triplet of FIG. 11

| Surface | Type | Curvature | Thickness | Glass | Semi-Diameter |
|---|---|---|---|---|---|
| 0 | STANDARD | 0.00E+00 | Variable | | 3.57E+02 |
| 1 | STANDARD | −3.94E−01 | 1.50E+00 | SF66 | 1.22E+00 |
| 2 | STANDARD | −2.28E−01 | 5.15E−02 | | 1.33E+00 |
| 3 | STANDARD | 1.06E−01 | 1.00E+00 | N-FK51 | 1.28E+00 |
| 4 | STANDARD | −2.95E−01 | 9.77E−02 | | 1.17E+00 |
| 5 | STANDARD | 0.00E+00 | 1.95E−01 | | 1.03E+00 |
| 6 | STANDARD | 5.56E−01 | 1.00E+00 | N-FK51 | 1.14E+00 |
| 7 | STANDARD | 6.47E−01 | 4.29E+00 | | 1.00E+00 |
| 8 | STANDARD | 0.00E+00 | 0.00E+00 | | 2.19E+00 |

Figure 13:
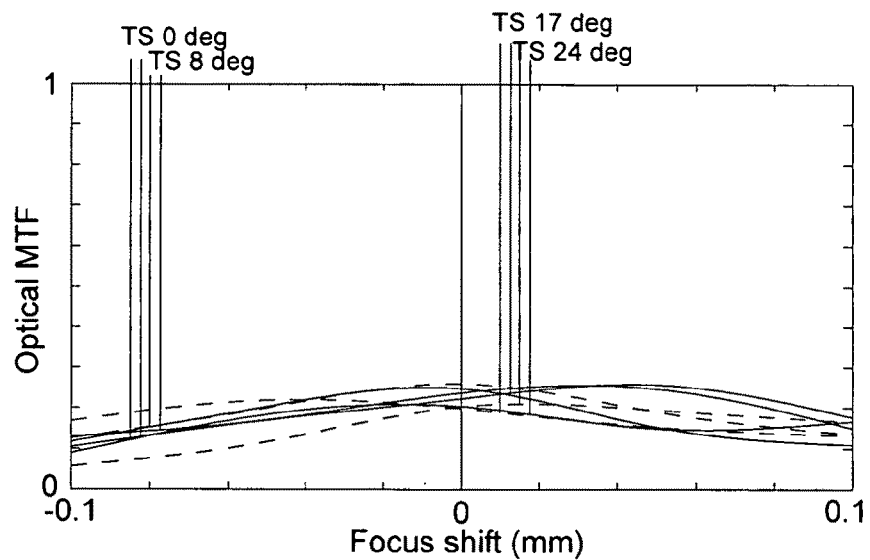
FIG. 13 is a graph of optical MTF as a function of focus shift, for the aberrated triplet of FIG. 11.
Figure 14:
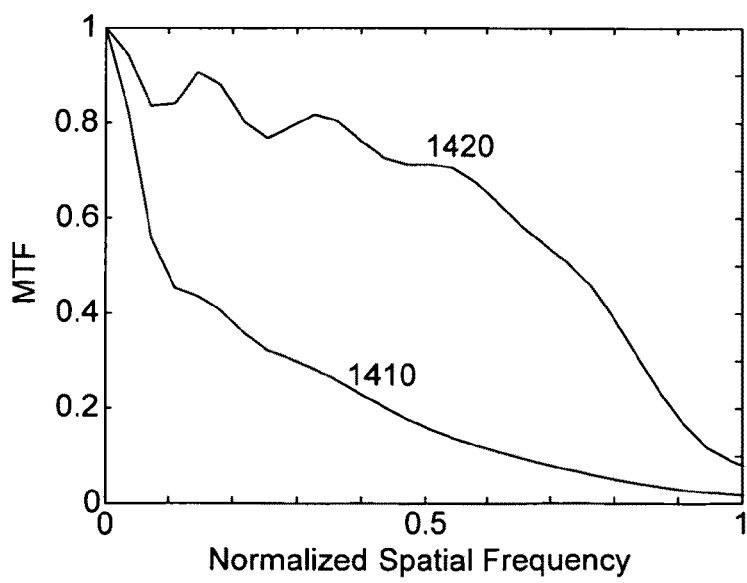
FIG. 14 is a graph of the MTF for the aberrated triplet of FIG. 11, before and after image processing.
Figure 12A:
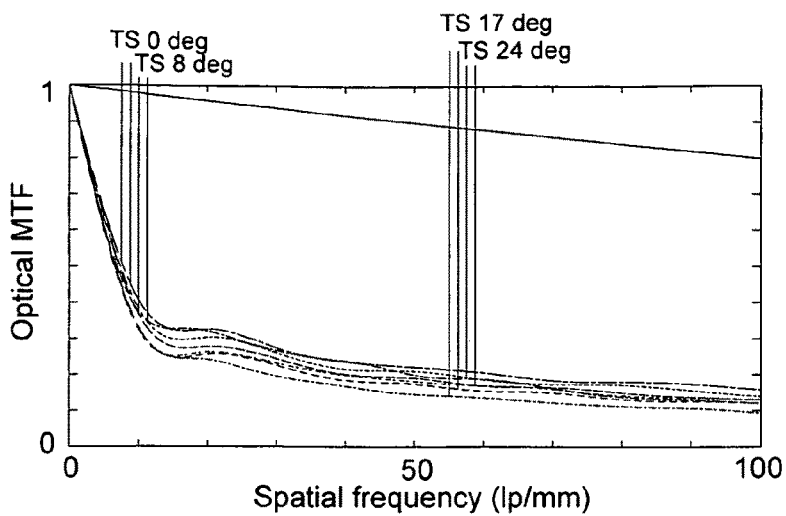
FIGS. 12a-12c are graphs of optical MTFs for the aberrated triplet of FIG. 11.
Figure 12B:
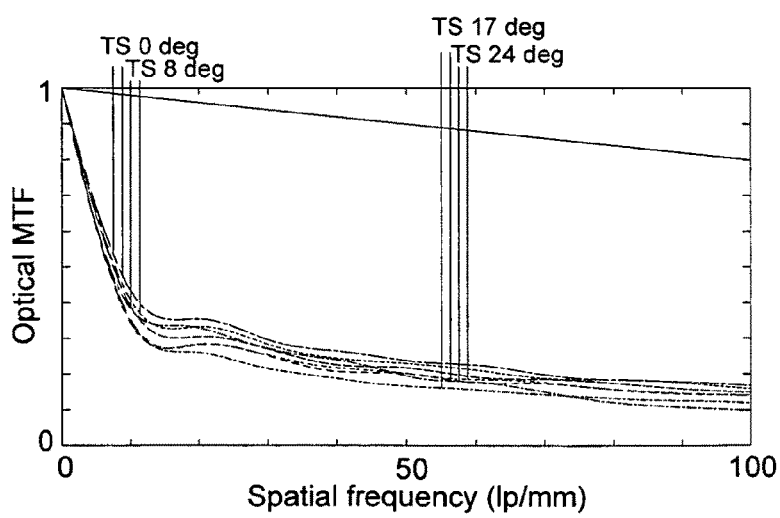
Figure 12C:
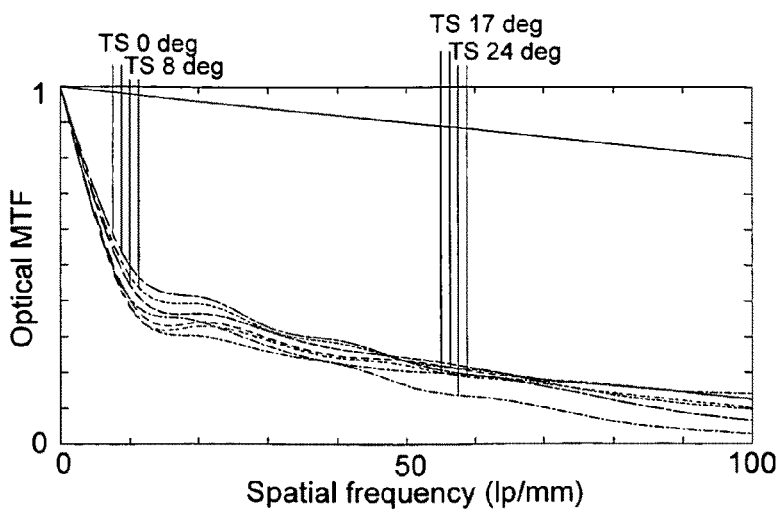

FIGS. 12a-12c shows the optical MTF measured at λ=0.5876 μm for objects at 10 m, 0.8 m, and 0.25 m, respectively. FIG. 13 graphs the optical MTF measured at λ=0.5876 μm and at 50 lp/mm as a function of the focus shift (i.e., deviation from the nominal image plane). The optical MTF is fairly constant and insensitive to defocus. This NPN triplet is capable of extending the range for the depth of field to 3 waves of defocus. The system has an oversampling factor of 7 for the green channel. FIG. 14 shows the MTFs 1410 and 1420 before and after image processing.

Figure 15:
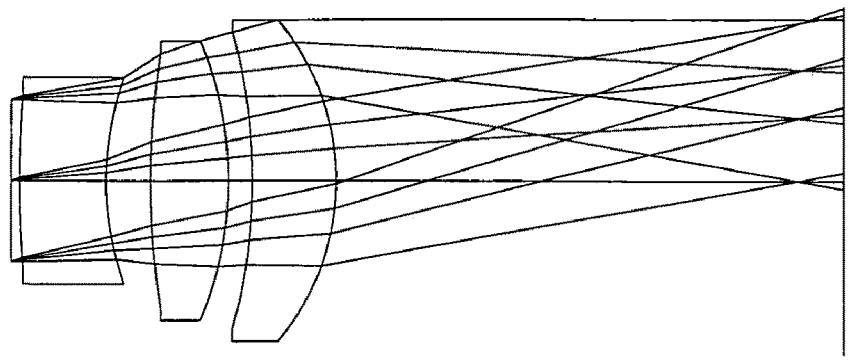
FIG. 15 is a diagram of yet another aberrated triplet according to the invention.
Figure 17:
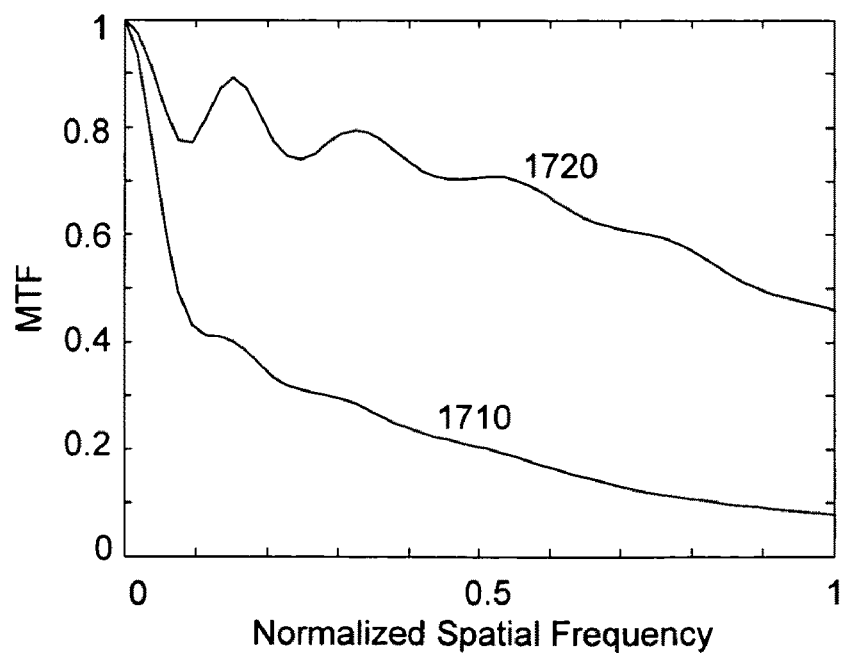
FIG. 17 is a graph of the MTF for the aberrated triplet of FIG. 15, before and after image processing.
Figure 16A:
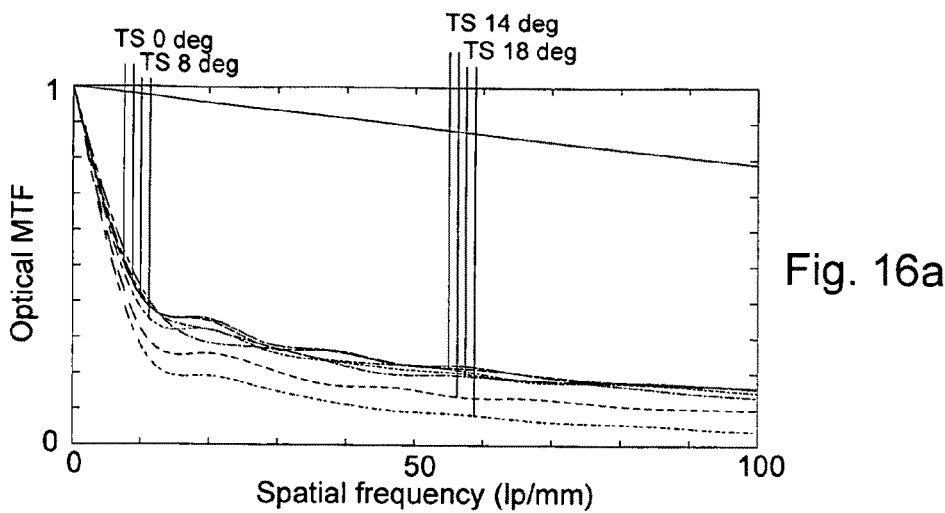
FIGS. 16a-16c are graphs of optical MTFs for the aberrated triplet of FIG. 15.
Figure 16B:
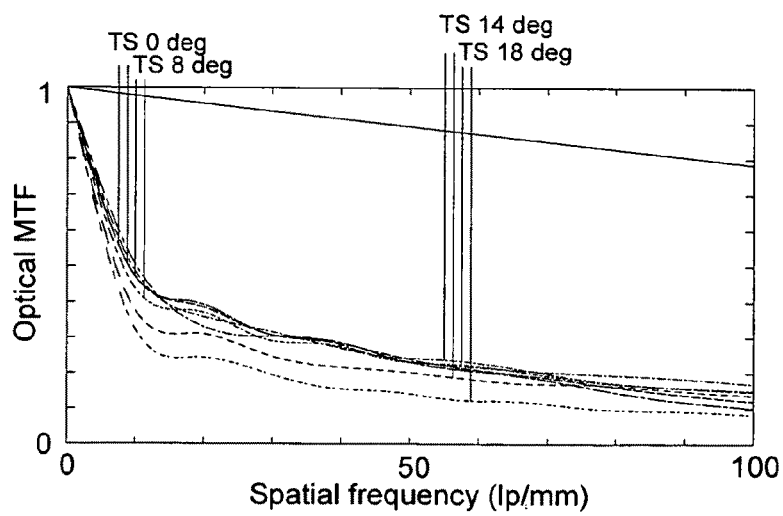
Figure 16C:
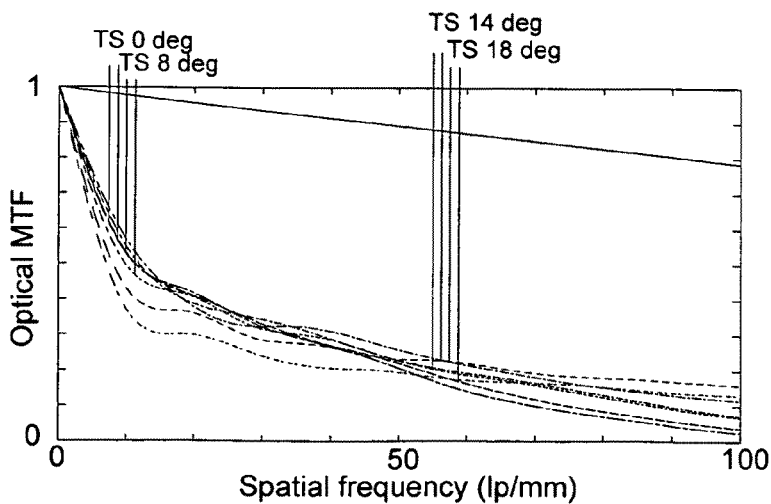

FIGS. 15-17 show one final example. FIG. 15 shows the NPP triplet, with Table 4 giving the optical prescription. This application is a 40 degree full field of view, F/2.8, visible color (RGB) imaging, 5 μm pixels (pitch), and ¼ inch detector array. FIGS. 16a-16c graph the optical MTF measured at λ=0.5876 μm for objects at 10 m, 0.8 m, and 0.4 m, respectively. FIG. 17 shows the MTFs 1710 and 1720 before and after image processing.

TABLE 4

Optical prescription for NPP triplet of FIG. 14

| Surface | Type | Curvature | Thickness | Glass | Semi-Diameter |
|---|---|---|---|---|---|
| 0 | STANDARD | 0.00E+00 | Variable | | 1.09E+04 |
| 1 | STANDARD | 0.00E+00 | 1.00E−01 | | 9.72E−01 |
| 2 | STANDARD | 7.79E−02 | 1.00E+00 | TIF6 | 1.02E+00 |
| 3 | STANDARD | 2.69E−01 | 5.67E−01 | | 1.24E+00 |
| 4 | STANDARD | 1.12E−01 | 1.00E+00 | N-PK51 | 1.57E+00 |
| 5 | STANDARD | −2.16E−01 | 2.87E−01 | | 1.73E+00 |
| 6 | STANDARD | −1.26E−01 | 1.00E+00 | N-PK51 | 1.84E+00 |
| 7 | STANDARD | −3.09E−01 | 6.00E+00 | | 1.97E+00 |
| 8 | STANDARD | 0.00E+00 | 0.00E+00 | | 2.11E+00 |

Although the detailed description contains many specifics, these should not be construed as limiting the scope of the invention but merely as illustrating different examples and aspects of the invention. It should be appreciated that the scope of the invention includes other embodiments not discussed in detail above. For example, in another class of designs, a telephoto group is followed by a field correcting (distortion correction) group. In the NPN triplet form, the first two elements (NP) can be considered to be a telephoto group, followed by the last element (N) that acts as a field correcting group. The telephoto group accentuates the spherical aberration by expanding the beam prior to the positive element, exacerbating the spherical aberration in the optical system. This incurs field distortion errors, which can then be corrected by the field correcting group.

As another example, the spectral bandwidth of the electro-optic imaging system will vary depending on the application. Example systems may have spectral bandwidths of 100 nm (basically monochrome), 200 nm, 300 nm or more. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An electro-optic imaging system comprising:
   a rotationally symmetric triplet lens characterized by an optical MTF;
   a detector subsystem positioned to capture an image formed by the triplet lens, the detector subsystem having an array of detectors that define a Nyquist frequency for the detector subsystem, the optical MTF remaining above 0.1 and below 0.75 for all frequencies between 0.20 and 1.00 times the Nyquist frequency and for all image plane positions through at least one wave of defocus on either side of a nominal image plane; and a digital image processing subsystem coupled to the detector subsystem, that for at least some of the pixels in the image captured by the detector subsystem, provides normalized gain of at least 1.3 to at least some of the frequencies between 0.20 and 0.80 times the Nyquist frequency.

2. The electro-optic imaging system of claim 1 wherein the optical MTF remains above 0.1 and below 0.50 for all frequencies between 0.20 and 1.00 times the Nyquist frequency and for all image plane positions within one wave of defocus on either side of the nominal image plane.

3. The electro-optic imaging system of claim 1 wherein the optical MTF remains above 0.1 and below 0.50 for all frequencies between 0.20 and 1.00 times the Nyquist frequency and for all image plane positions within 1.5 waves of defocus on either side of the nominal image plane.

4. The electro-optic imaging system of claim 1 wherein the optical MTF remains above 0.1 and below 0.50 for all frequencies between 0.30 and 1.00 times the Nyquist frequency and for all image plane positions within 0.5 waves of defocus on either side of the nominal image plane.

5. The electro-optic imaging system of claim 1 wherein the electro-optic imaging system has a system MTF between 0.8 and 1.1 for all frequencies in the range of 0.2 to 0.4× Nyquist frequency.

6. The electro-optic imaging system of claim 1 wherein the electro-optic imaging system has a system MTF between 0.6 and 0.9 for all frequencies in the range of 0.4 to 0.7× Nyquist frequency.

7. The electro-optic imaging system of claim 1 wherein the electro-optic imaging system has a system MTF between 0.4 and 0.8 for all frequencies in the range of 0.7 to 0.9× Nyquist frequency.

8. The electro-optic imaging system of claim 1 wherein the triplet lens has at least two waves of spherical aberration and the detector subsystem has an oversampling factor of at least three.

9. The electro-optic imaging system of claim 1 wherein the triplet lens has at least four waves of spherical aberration and the detector subsystem has an oversampling factor of at least five.

10. The electro-optic imaging system of claim 1 wherein the triplet lens has at least six waves of spherical aberration and the detector subsystem has an oversampling factor of at least six.

11. The electro-optic imaging system of claim 1 wherein the detector subsystem is positioned at a back focal distance such that the triplet lens has an RMS spot size that is at least 20% larger than an RMS spot size at a back focal distance that minimizes the RMS spot size.

12. The electro-optic imaging system of claim 1 wherein the rotationally symmetric triplet lens comprises:
a first rotationally symmetric negative lens element,
a second rotationally symmetric positive lens element, and
a third rotationally symmetric negative lens element.

13. The electro-optic imaging system of claim 11 wherein each of the three lens elements is a spherical lens element.

14. The electro-optic imaging system of claim 11 wherein the triplet lens further comprises:
an aperture stop located between the first and second lens elements.

15. The electro-optic imaging system of claim 11 wherein the triplet lens further comprises:
an aperture stop located between the second and third lens elements.

16. The electro-optic imaging system of claim 1 wherein the rotationally symmetric triplet lens comprises:
a first rotationally symmetric negative lens element,
a second rotationally symmetric positive lens element, and
a third rotationally symmetric positive lens element.

17. The electro-optic imaging system of claim 16 wherein the triplet lens further comprises:
an aperture stop located before the first lens element.

18. The electro-optic imaging system of claim 1 wherein the electro-optic imaging system has a full field of view of at least 30 degrees.

19. The electro-optic imaging system of claim 1 wherein the electro-optic imaging system has a full field of view of at least 20 degrees.

20. The electro-optic imaging system of claim 1 wherein the electro-optic imaging system has a full field of view of at least 15 degrees.

21. The electro-optic imaging system of claim 1 wherein the electro-optic imaging system has an F/# of F/5 or faster.

22. The electro-optic imaging system of claim 1 wherein the electro-optic imaging system has a spectral bandwidth of at least 300 nm.

23. The electro-optic imaging system of claim 1 wherein the digital image processing subsystem applies linear filtering to at least some of the pixels in the image captured by the detector subsystem.

24. The electro-optic imaging system of claim 23 wherein the digital image processing subsystem applies spatially invariant linear filtering to at least some of the pixels in the captured image.

25. The electro-optic imaging system of claim 23 wherein the digital image processing subsystem applies spatially varying linear filtering to at least some of the pixels in the captured image.

26. The electro-optic imaging system of claim 1 wherein the digital image processing subsystem applies nonlinear filtering to at least some of the pixels in the image captured by the detector subsystem.

27. The electro-optic imaging system of claim 1 wherein the digital image processing subsystem applies rotationally symmetric filtering to at least some of the pixels in the image captured by the detector subsystem.

28. The electro-optic imaging system of claim 1 wherein the digital image processing subsystem applies rotationally nonsymmetric filtering to at least some of the pixels in the image captured by the detector subsystem.

29. The electro-optic imaging system of claim 1 wherein the digital image processing subsystem applies bandpass filtering to at least some of the pixels in the image captured by the detector subsystem.

30. The electro-optic imaging system of claim 1 wherein the digital image processing subsystem applies highpass filtering to at least some of the pixels in the image captured by the detector subsystem.

* * * * *